United States Patent [19]

Scoarnec et al.

[11] 4,353,354
[45] Oct. 12, 1982

[54] SOLAR ENERGY TRANSFER MEMBER FOR INTRODUCTION INTO AN ENVELOPE OF A SOLAR COLLECTOR

[75] Inventors: Louis Scoarnec; Patrick Herbert, both of Paris, France

[73] Assignee: Compagnie des Lampes, France

[21] Appl. No.: 100,131

[22] Filed: Dec. 4, 1979

[30] Foreign Application Priority Data

Dec. 12, 1978 [FR] France .................. 78 34878

[51] Int. Cl.³ .................................................. F24J 3/02
[52] U.S. Cl. .................................................. 126/443
[58] Field of Search .................................... 126/443

[56] References Cited

U.S. PATENT DOCUMENTS 3,227,153  1/1966  Godel et al. .................. 126/443
4,124,019  11/1978  Heffelfinger .................. 126/443

Primary Examiner—Carroll B. Dority, Jr.

[57] ABSTRACT

The invention relates to a member for transferring solar energy by a heat transfer fluid.

It comprises an assembly of three tubes, the first being introduced into the hollow part of cross-section (SV) of a collector envelope, the second providing the upstream connection of the general circuit to the said member, comprising a straight portion which penetrates the first tube and a flattened portion which is to be engaged with the flattened portion of a third tube which, downstream, connects said member to the general fluid circulation circuit. The first tube is sealed by means of a hollow connecting plug and the cross-sections (S1) and (S2), respectively of the first and second tubes are selected in such a way that (S1–S2) is substantially equal to (S2), the cross-section (S1) being itself close to the cross-section (SV) of the hollow part of the envelope.

2 Claims, 4 Drawing Figures

U.S. Patent     Oct. 12, 1982     4,353,354
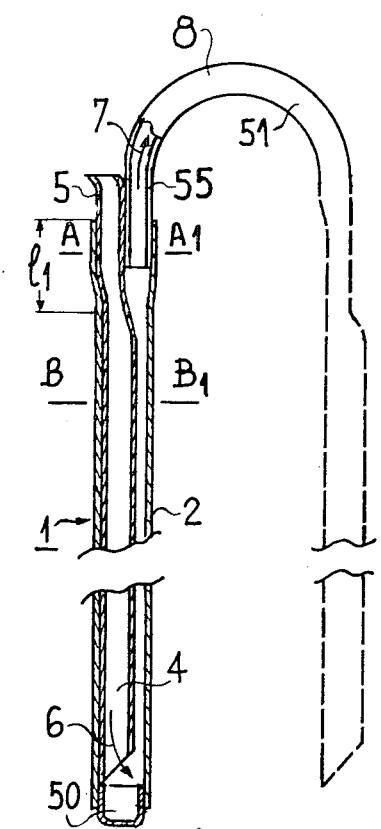
FIG_1
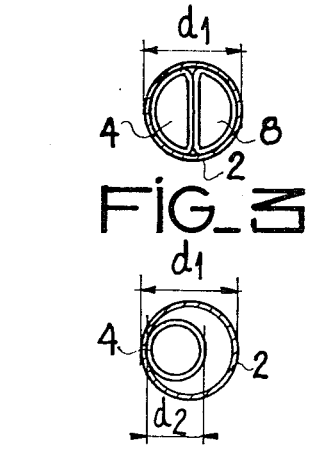
FIG_2
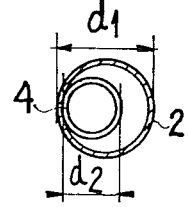
FIG_3
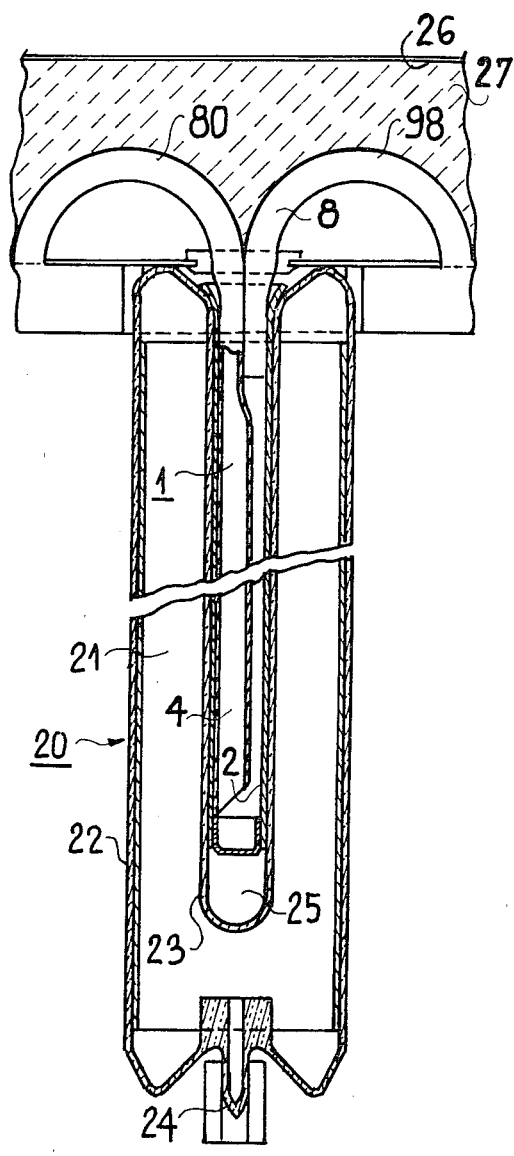
FIG_4

SOLAR ENERGY TRANSFER MEMBER FOR INTRODUCTION INTO AN ENVELOPE OF A SOLAR COLLECTOR

The present invention relates to a member for the transfer of solar energy, more particularly by means of a heat transfer fluid, said member being introduced into the envelope of a solar collector. It also relates to collectors of this type, equipped with such members.

In order to obtain a good heat transfer between the inner wall of a solar collector envelope and the heat transfer fluid it is necessary to have a good heat conduction between these. This can be obtained, for example, by means of an intermediate member, which is a good heat conductor and is in intimate contact with on the one hand the envelope and on the other with the tube in which the heat transfer fluid circulates. This solution is often costly and difficult to realize from the technological standpoint. This good conduction can also be obtained by an arrangement of the tube or tubes within the envelope in such a way that the member introduced into the same occupies most of the free volumes and only leaving between the envelope wall and the tube a layer of air which is sufficiently thin to permit the utilization of the conducting properties of the air.

The present invention relates to a solar energy transfer member which is to be introduced into a solar collector envelope, whose arrangement makes it possible to obtain the above-indicated result.

It specifically relates to a member for the transfer of solar energy by a heat transfer fluid, which is to be introduced into the hollow part of a solar collector envelope having a cross-section (SV) and which is to be connected upstream and downstream of said envelope to a general heat transfer fluid circuit, wherein it comprises a first tube of cross-section (S1) placed within the hollow portion and on the one hand a second tube of cross-section (S2) connected upstream to the general heat transfer fluid circuit and which itself penetrates the interior of said first tube, a hollow connecting plug sealing the end of the first tube and permitting the circulation of the heat transfer fluid between the inside of the second tube and the free cross-section (S1-S2) and on the other hand a third tube for ensuring the circulation of the fluid downstream of the member from said free section (S1-S2) to a general fluid circulation circuit, the second and third tubes having in each case a flattened section over a given length $l_1$ such that when said two tubes are introduced into the first tube the flattened sections are engaged and rendered integral with one another and with said first tube.

The invention is described in greater detail hereinafter relative to non-limitative embodiments and the attached drawings, wherein:

FIG. 1 diagrammatically shows a solar energy transfer member according to the invention;

FIG. 2 is a section along line $A-A_1$ of FIG. 1;

FIG. 3 is a section along line $B-B_1$ of FIG. 1; and

FIG. 4 shows an embodiment of a solar collector into which is introduced a member shown in FIG. 1.

For reasons of clarity the same elements carry the same references in all the drawings.

As is shown in FIG. 1, and FIGS. 2 and 3 which are respectively sections at $AA_1$ and $BB_1$ of FIG. 1, a member 1 according to the invention is constituted by a first tube 2 made from a good heat conducting material and having a circular cross-section S1 over its entire length and which is to be placed in the hollow part of the envelope of a not shown solar collector. The diameter $d_1$ of the tube is close to the diameter of said hollow part, in such a way that the cross-section S1 of the first tube and the cross-section SV of said hollow part are substantially the same. After introducing the member into the envelope there is only an air layer which is sufficiently thin to enable the heat conduction properties of said layer to serve for the transfer of heat between the inner wall of the envelope and the heat transfer fluid, which normally circulates within member 1. The latter in fact constitutes part of the general circuit for the circulation of said fluid. A second tube 4 is introduced into the first tube 2. It has a diameter $d_2$ such that its cross-section S2 leads to a free cross-section (S1-S2), which is approximately equal to S2 over almost the entire length of the first tube 2 which penetrates the envelope. However, it also has a zone 5, flattened over a length $l_1$ at the end of first tube 2. A hollow connecting plug 50 seals the second end of the first tube 2, whilst permitting the heat transfer fluid to circulate in the free section (S1-S2). This circulation is diagrammatically indicated by arrows 6 and 7. After circulating in the section (S1-S2) the heat transfer fluid is routed in the manner shown by arrow 7 towards the general fluid circulation circuit by means of a third tube 8, having a flattened zone 55 comparable to the flattened zone 5 of the second tube 4 and against which it is engaged in the manner shown in FIG. 2, which is a cross-section along the line $AA_1$ of FIG. 1. This flattened zone 55 of the third tube 8 is extended downstream of member 1 by a bent zone 51, which in turn is extended in the non-limitative embodiment shown by a straight branch (shown by dotted lines) constituting a tube like the second tube 4 which, in turn, can be introduced into a first tube 2, itself placed in another envelope of another collector. In the same way the flattened zone 5 of the second tube 4 is extended upstream of member 1, so that it can also be connected to the remainder of the general fluid circulation circuit.

FIG. 4 diagrammatically shows an embodiment of a solar collector equipped with a member 1 according to the invention. Collector 20 is constituted by an envelope 21 having two sealed transparent walls 22 and 23 within which a vacuum is formed, for example by means of an element 24, which is then hermetically sealed in per se known manner. Envelope 21 has a hollow part 25, into which is introduced the member 1 according to the invention. A housing 26, which is filled with a good thermal insulant 27, has thermally insulate zones 80 and 98. The sealing of the tubes (2, 4, 8), which are preferably metallic is provided by any means normally used in plumbing.

As has been stated hereinbefore the tubes forming the member according to the invention occupy almost all the cross-section of hollow part 25 of envelope 21 of collector 20. In order to improve the heat transfer between inner wall 23 of the envelope and the heat transfer fluid circuit it may be advantageous to use a sleeve in the form of a glove finger (not shown in the drawing) made from a knitted metallic fabric in order to envelop the entire length of the first tube 2 placed in the hollow part 25 of the envelope.

The knitted metal fabric is constituted by wires made from a metal, which is a good heat conductor and said wires have a diameter of a few dozen millimeters. It is made from meshes which are sufficiently loose to fill by elasticity the space between the outer wall of the first tube 2 and the inner wall 23 of the envelope, thus creating a certain number of evenly distributed thermal bridges, which improve heat transfer.

A plurality of collector equipped with members according to the invention can be grouped to form solar panels.

The invention is not limited to the embodiments described and represented hereinbefore and various modifications can be made thereto without passing beyond the scope of the invention.

What is claimed is:

1. A member for the transfer of solar energy by a heat transfer fluid, which is to be introduced into the hollow part of a solar collector envelope having a cross-section (SV) and which is to be connected upstream and downstream of said envelope to a general heat transfer fluid circuit, wherein it comprises a first tube of cross-section (S1) placed within the hollow portion and on the one hand a second tube of cross-section (S2) connected upstream to the general heat transfer fluid circuit and which itself penetrates the interior of said first tube, a hollow connecting plug sealing the end of the first tube and permitting the circulation of the heat transfer fluid between the inside of the second tube and the free cross-section (S1–S2) and on the other hand a third tube for ensuring the circulation of the fluid downstream of the member from said free section (S1–S2) to a general fluid circulation circuit, the second and third tubes having in each case a flattened section over a given length $l_1$ such that when said two tubes are introduced into the first tube the flattened sections are engaged and rendered integral with one another and with said first tube.

2. A solar energy transfer member according to claim 1, wherein the cross-section (S1) of the first tube is close to the section (SV) of the hollow part of the envelope in such a way that there is only a thin air layer between said tube and the envelope.

* * * * *